(12) United States Patent
Batta et al.

(10) Patent No.: US 9,624,869 B2
(45) Date of Patent: Apr. 18, 2017

(54) COOLING MOAT FOR UPPER CYLINDER LINER SEAL

(71) Applicant: Caterpillar Inc., Peoria, IL (US)

(72) Inventors: Christopher Batta, West Lafayette, IN (US); Thomas Bowman, Greenfield, IN (US)

(73) Assignee: Caterpillar Inc., Peoria, IL (US)

( * ) Notice: Subject to any disclaimer, the term of this patent is extended or adjusted under 35 U.S.C. 154(b) by 237 days.

(21) Appl. No.: 14/463,891

(22) Filed: Aug. 20, 2014

(65) Prior Publication Data

US 2016/0053711 A1    Feb. 25, 2016

(51) Int. Cl.
| | | |
|---|---|---|
| F02F 1/14 | (2006.01) |
| F02F 1/40 | (2006.01) |
| F02F 1/00 | (2006.01) |
| F01P 3/02 | (2006.01) |
| F02F 1/10 | (2006.01) |
| F02F 1/16 | (2006.01) |
| F16J 10/04 | (2006.01) |

(52) U.S. Cl.
CPC ............... *F02F 1/004* (2013.01); *F01P 3/02* (2013.01); *F02F 1/10* (2013.01); *F02F 1/14* (2013.01); *F02F 1/16* (2013.01); *F02F 1/40* (2013.01); *F16J 10/04* (2013.01)

(58) Field of Classification Search
CPC ........ F02F 1/14; F02F 1/16; F02F 1/40; F02F 1/4214; F02F 2001/245; F01P 3/02
USPC ........................................ 123/41.79, 14.82 R
See application file for complete search history.

(56) References Cited

U.S. PATENT DOCUMENTS

| | | |
|---|---|---|
| 3,410,256 A | 11/1968 | Herschmann |
| 4,099,725 A * | 7/1978 | Wolters .................. F02F 11/005 123/193.3 |
| 5,165,367 A | 11/1992 | Morris |
| 5,957,103 A | 9/1999 | Takami et al. |
| 6,328,001 B1 | 12/2001 | Kirtley et al. |
| 7,334,546 B2 * | 2/2008 | Rasmussen ............. F02F 1/004 123/41.84 |
| 2007/0227475 A1 | 10/2007 | Hiramitsu et al. |

FOREIGN PATENT DOCUMENTS

WO    2013/190175 A1    12/2013

* cited by examiner

*Primary Examiner* — Carlos A Rivera
*Assistant Examiner* — Syed O Hasan
(74) *Attorney, Agent, or Firm* — Baker Hostetler

(57) ABSTRACT

A cylinder liner associated with an internal combustion engine includes a cooling moat to reduce temperatures at an upper cylinder liner seal. The cooling moat may have a gap extending upwardly toward an inner running surface of the cylinder liner to supply coolant to an upper portion of the cylinder liner. The cooling moat may be provided at a location between the inner running surface of the cylinder liner and a groove for the upper cylinder liner seal.

13 Claims, 2 Drawing Sheets

US 9,624,869 B2

COOLING MOAT FOR UPPER CYLINDER LINER SEAL

TECHNICAL FIELD

This patent disclosure relates generally to a cylinder liner for an internal combustion engine and, more particularly, to a cooling moat for cooling an upper cylinder liner seal associated with the cylinder liner that is installed in a cylinder bore of the internal combustion engine.

BACKGROUND

An internal combustion engine, such as a diesel or a gasoline engine, includes an engine block defining a plurality of cylinder bores. During operation, pistons reciprocate within the cylinder bores during combustion events to generate mechanical power. Each cylinder bore may include a cylinder liner in which the piston reciprocates, and the cylinder liner may be fitted into the cylinder bore. Cylinder liners allow an engine block with a particular cylinder bore configuration and size to be used with different diameter pistons by simply changing the cylinder liners for a particularly configured engine. Additionally, the cylinder liners may be removed and replaced if worn or damaged.

The inner surface of the cylinder liner, also known as a running surface, serves as a sliding surface for piston rings of the piston. An outer surface of the cylinder liner forms a coolant circulation space for cooling the cylinder liner. During the combustion events, the cylinder liner is subject to high loads and stresses, including thermal stresses. Because the piston rings slide on the running surface of the cylinder liner, and the cylinder liner bounds at least a portion of the combustion chamber, heat is transferred from an interior side of the cylinder liner to an exterior side of the cylinder liner.

WIPO Publication WO 2013/190175 A1, entitled "Piston Engine and Cylinder Liner" describes an exemplary cylinder liner arranged partially inside an engine block and within a cooling jacket.

Although effective for certain engine configurations, the cylinder liners, and particularly those installed completely within an engine block, may not be able to cope with the demands of higher powered engines. As in-cylinder temperatures produced by the higher powered engines are greater than those of previous engines, the seal material of conventional cylinder liners are no longer able to handle the resulting higher temperature demands without degrading to a point of failure due to thermal distress. Accordingly, there is a need for an improved cylinder liner.

SUMMARY

In one aspect, the present disclosure describes a cylinder liner for an engine including a hollow cylindrical sleeve extending from a lower end and an upper end, the hollow cylindrical sleeve having an outer surface and an inner running surface. The cylinder liner can also include an annular flange extending radially from the upper end of the hollow cylindrical sleeve. The cylinder can also include a cooling moat having a gap extending upwardly from an edge of the annular flange toward the inner running surface of the hollow cylindrical sleeve.

In another aspect, the disclosure describes an internal combustion engine including an engine block having at least one engine cylinder, and a cylinder liner mounted in the at least one engine cylinder. The cylinder liner mounted in the at least one engine cylinder can include a hollow cylindrical sleeve extending from a lower end and an upper end, the hollow cylindrical sleeve having an outer surface and an inner running surface. The cylinder liner mounted in the at least one engine cylinder can also include an annular flange extending radially from the upper end of the hollow cylindrical sleeve. The cylinder liner mounted in the at least one engine cylinder can also include a cooling moat having a gap extending upwardly from an edge of the annular flange toward the inner running surface of the hollow cylindrical sleeve.

DETAILED DESCRIPTION

Figure 1:
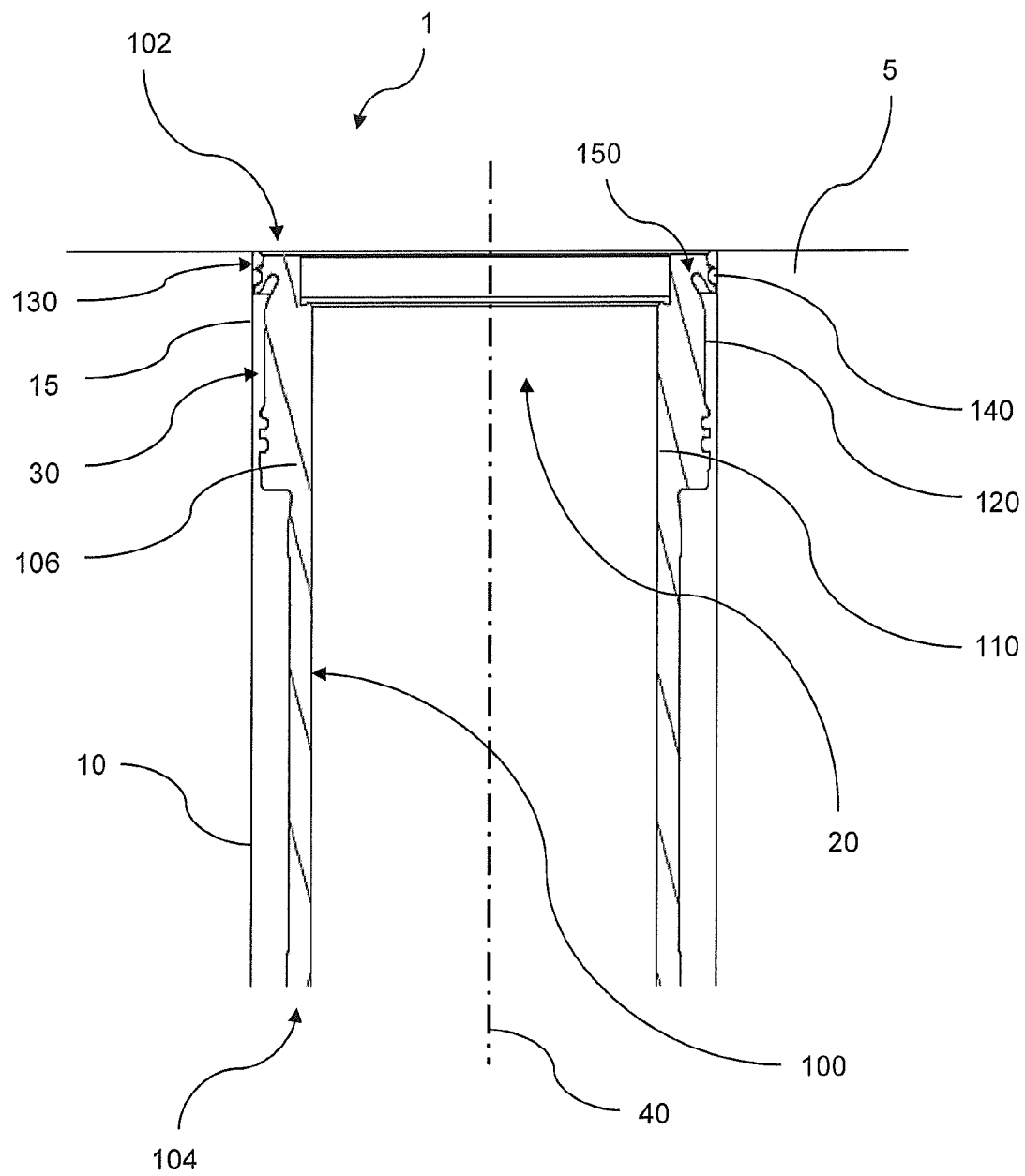
FIG. 1 is cross-sectional view of part of an engine with a cylinder liner including a cooling moat.

Now referring to the drawings, wherein like reference numbers refer to like elements, FIG. 1 illustrates an internal combustion engine 1, which generally includes an engine block 5 having one or more cylinder bores 10. Each of the one or more cylinder bores 10 may be installed with a cylinder liner 100. The cylinder liner 100 may be removably mounted in the cylinder bores 10 of the engine 1. The cylinder liner 100 has a generally hollow cylindrical sleeve 106 with an upper end 102 and a lower end 104 extending along a longitudinal axis 40, and includes an inner running surface 110 and an outer surface 120.

Figure 2:
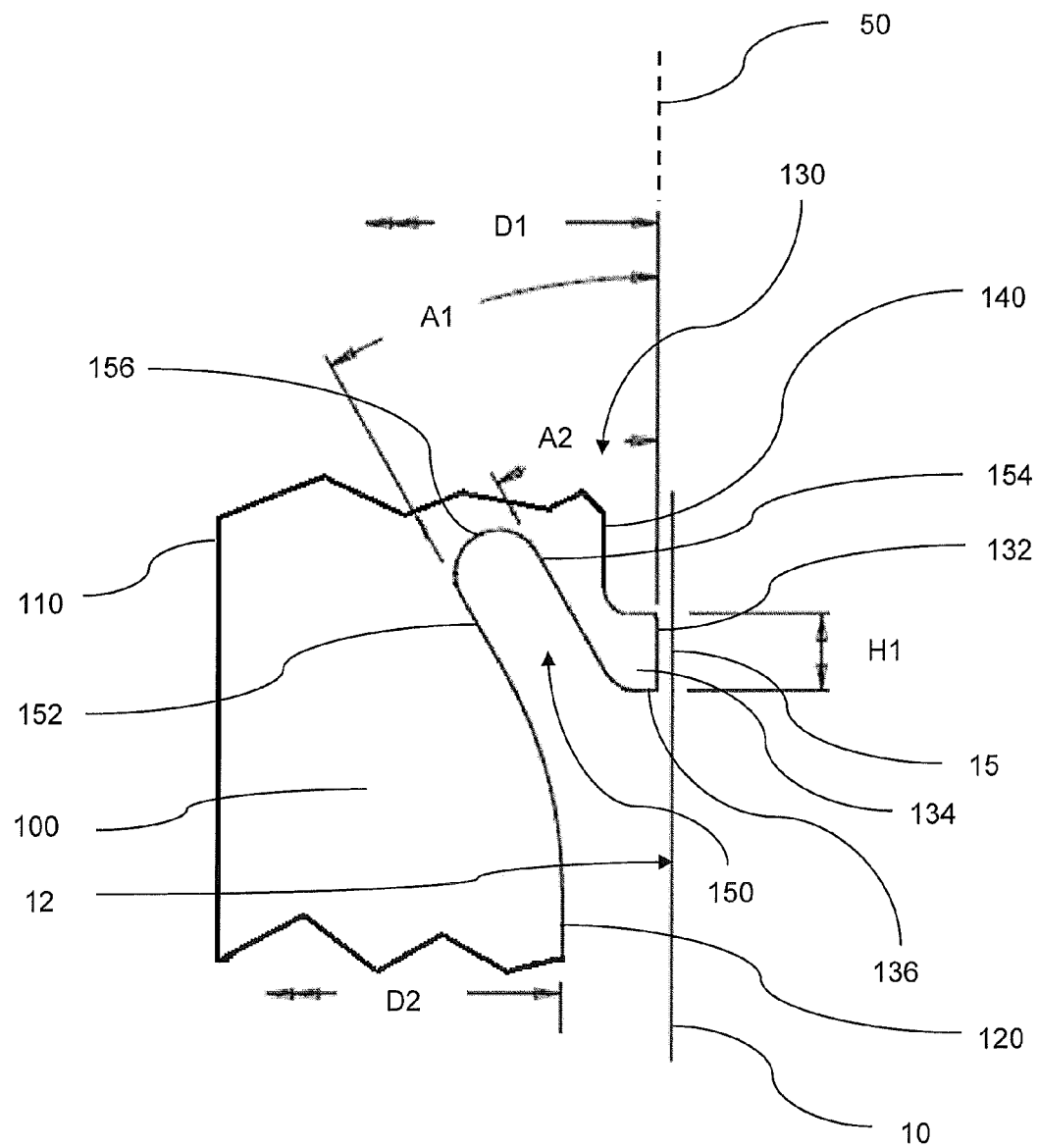
FIG. 2 is a fragmentary, cross-sectional view of the cooling moat of the cylinder liner shown in FIG. 1.

The cylinder liner 100 includes an annular flange 130 extending radially from an upper end 102 of the cylinder liner 100. As shown in FIG. 2, an outer surface 132 of the annular flange 130 mates with a mounting surface 15 of the cylinder bore 10 of the engine 1. Also shown in FIG. 2, the annular flange 130 has a circumferential land portion 134 and an upper cylinder liner seal groove 140, which may be disposed above the land portion 134. In some embodiments, the land portion 134, may have a height H1 of 4.4 mm.

The upper cylinder liner seal groove 140 may carry a seal to provide a fluidic seal between the cylinder liner 100 and cylinder bore 10 of the engine 1 when installed. In some embodiments, the seal may be an O-ring seal (not shown) installed on the upper cylinder liner seal groove 140 that encircles an outer periphery of the annular flange 130. Together the cylinder bore 10, the cylinder liner 100, and the seal may bound an upper section of a cooling cavity 30, which may be used to supply coolant to at least an upper region of the cylinder bore 10 and the cylinder liner 100 to remove heat produced by the engine 1 during combustion events.

The cylinder liner 100 may be made of cast grade iron, cast grade alloy, ductile iron, bainite, or any other suitable material. The seal may be made of EPDM (ethyleme propylene diene monomer), or fluroelastomers such as coolant-resistant FKM, AFLAS®, or any other suitable material. However, as demand for higher output engines continues, the in-cylinder temperatures generated by the higher output engines have increased to a point such that the seals installed on conventional cylinder liners can no longer withstand the high temperatures, and the seals degrade rapidly to a point of failure due to thermal distress.

To address the higher in-cylinder temperatures and to reduce temperatures at the upper cylinder liner seal groove 140, a cooling moat 150 may be provided at a location between the upper cylinder liner seal groove 140 and the inner running surface 110 of the cylinder liner 100, with respect to a radial direction. The cooling moat 150 may form a gap extending upwardly toward a center of the cylinder liner 100 to allow coolant to flow therebetween. In some embodiments, the cooling moat 150 may be in direct fluid communication with a cooling cavity 30 (see FIG. 1) formed in the cylinder bore 10 between the engine block 5 and the cylinder liner 100. The presence of coolant at the cooling moat 150 may form a thermal barrier to reduce heat transfer to the upper cylinder liner seal groove 140, resulting in lower seal temperatures and preventing seal distress and thermal failure.

Referring to FIG. 2, a first outer diameter D1 of the cylinder liner 100, at the land portion 134, may be between 228 mm to 232 mm. In some embodiments, the first outer diameter D1 may be 231 mm. A second outer diameter D2 of the cylinder liner 100 at the outer surface 120 may be approximately 220 mm. A radial clearance between the land portion 134 and walls 12 of the cylinder bore 10 may be between 0.1 mm to 3 mm, depending on engine block 5 and cylinder liner 100 tolerances.

Starting from a bottom surface 136 of the annular flange 130, the cooling moat 150 may extend upwardly toward the inner running surface 110 of the cylinder liner 100, forming a gap that extends circumferentially along an underside of the annular flange 130. The cooling moat 150, may include a first moat wall 152 and a second moat wall 154. The first moat wall 152 and the second moat wall 154 may extend upwardly, toward a center of the cylinder liner 100 at an angle of the first moat wall A1 and the angle of the second moat wall A2, respectively. The angle of the first moat wall A1 and an angle of the second moat wall A2 may be between 20° to 60°, with respect to a longitudinal axis 50 defined by an outer longitudinal surface of the annular flange 130. In some embodiments, the angle of the first moat wall A1 and the angle of the second moat wall A2 may be equal such that the first moat wall 152 and the second moat wall 154 are parallel with each other. In some embodiments, the angle of the first moat wall A1 and angle of the second moat wall A2 may each be 30°. In some embodiments, a curve may be formed between the second outer diameter D2 and the first moat wall 152, and the curve may be defined by a radius of 25 mm.

The cooling moat 150 may include a hemi-spherical end 156, which may be formed during manufacturing or machining. A curvature of the hemi-spherical end 156 may be defined by a radius of between 1.5 mm to 4 mm. In some embodiments, the radius of the hemi-spherical end 156 may be 2.5 mm. A depth of the cooling moat 150, along an axis parallel to the first moat wall 152 and the second moat wall 154, may be between 1.5 mm to 11 mm. In some embodiments, the depth of the cooling moat 150 may be 3 mm. A width of the cooling moat 150, extending orthogonally from the first moat wall 152 to the second moat wall 154, may be between 3 mm to 8 mm. In some embodiments, the width of the cooling moat 150 may be 3 mm.

INDUSTRIAL APPLICABILITY

The present disclosure is applicable to cylinder liners in general and to cylinder liners installed in cylinder bores of an internal combustion engine. Various aspects of the present disclosure provide a cylinder liner including a cooling moat to lower seal temperatures and to prevent seal distress and thermal failure. In various embodiments, the cooling moat of the cylinder liner may allow coolant to flow in the cooling moat to form a thermal barrier located between an inner running surface of the cylinder liners and an upper cylinder liner seal groove of the cylinder liners. In various embodiments, the upper cylinder liner seal groove may be used to carry a seal.

Referring to FIG. 1, a cylinder liner 100 may be installed in a cylinder bore 10 of an internal combustion engine 1. An inner running surface 110 of the cylinder liner 100 provides a sliding surface for piston rings of the piston. The piston and the inner running surface 110, in part, form a combustion chamber 20 where fuel and air may be mixed together and combusted to generate mechanical power. To remove thermal energy, a cooling cavity 30 may be used to supply coolant to at least an upper region of the cylinder bore 10 and the cylinder liner 100 to remove heat produced by the engine 1 during combustion events. Additionally, a thermal barrier may be provided to reduce heat transfer to the upper cylinder liner seal groove 140 and an associated seal installed on the upper cylinder liner seal groove 140.

In particular, a cooling moat 150 may be provided between the upper cylinder liner seal groove 140 and the inner running surface 110 of the cylinder liner 100, with respect to a radial direction. The cooling moat 150 may form a gap extending upwardly toward a center of the cylinder liner 100 to allow coolant to flow therebetween. The gap of the cooling moat 150 reduces the number of direct heat conduction pathways to the upper cylinder liner seal groove 140, and coolant at the cooling moat 150 may draw heat away from the upper cylinder liner seal groove 140, thereby preventing seal distress and thermal failure of a seal installed on the upper cylinder liner seal groove 140.

Referring to FIG. 2, the cooling moat 150 may include a first moat wall 152 and a second moat wall 154. The first moat wall 152 and the second moat wall 154, may extend upwardly at an angle of between 20° to 60°. The cooling moat 150 may have a depth of between 1.5 mm to 11 mm, and may have a width of between 3 mm to 8 mm. The above arrangement and geometry of the cooling moat 150 may enable the cylinder liner 100 to withstand linear and hoop stresses associated with combustion events of the engine 1 without further reinforcement or modification to the cylinder liner 100. Furthermore, the arrangement and geometry of the cooling moat 150 may be formed without any complex tooling or machining and may help minimize tool chatter during machining and manufacturing.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

We claim:

1. A cylinder liner for an engine, comprising: a hollow cylindrical sleeve extending from a lower end and an upper end, the hollow cylindrical sleeve having an outer surface and an inner running surface; an annular flange extending radially from the upper end of the hollow cylindrical sleeve and having a circumferential land portion and a seal groove disposed above the circumferential land portion; and a cooling moat defined by the sleeve, the cooling moat having a gap extending upwardly from a bottom surface of the annular flange toward the inner running surface of the hollow cylindrical sleeve and between the seal groove and the inner running surface, wherein the cooling moat includes a first moat wall and a second moat wall, the first moat wall and the second moat wall each extend upwardly from the bottom surface of the annular flange at an angle of between 20° and 60° with respect to a longitudinal axis defined by an outer longitudinal surface of the annular flange.

2. The cylinder liner of claim 1, wherein a depth of the cooling moat from the bottom surface of the annular flange is between 1.5 mm and 11 mm.

3. The cylinder liner of claim 2, wherein the depth of the cooling moat from the bottom surface of the annular flange is 3 mm.

4. The cylinder liner of claim 1, wherein the cooling moat includes at least one moat wall.

5. The cylinder liner of claim 1, wherein the first moat wall and the second moat wall are parallel to each other.

6. The cylinder liner of claim 1, wherein the first moat wall and the second moat wall each extend upwardly from the bottom surface of the annular flange at an angle of 30° with respect to the longitudinal axis.

7. The cylinder liner of claim 1, wherein a width between the first moat wall and the second moat wall is between 3 mm and 8 mm.

8. The cylinder liner of claim 7, wherein the width between the first moat wall and the second moat wall is 3 mm.

9. An internal combustion engine, comprising: an engine block having at least one engine cylinder; and a cylinder liner mounted in the at least one engine cylinder, the cylinder liner including: a hollow cylindrical sleeve extending from a lower end and an upper end, the hollow cylindrical sleeve having an outer surface and an inner running surface, an annular flange extending radially from the upper end of the hollow cylindrical sleeve and having a circumferential land portion and a seal groove disposed above the circumferential land portion, and a cooling moat defined by the sleeve, the cooling moat having a gap extending upwardly from a bottom surface of the annular flange toward the inner running surface of the hollow cylindrical sleeve and between the seal groove and the inner running surface, wherein the cooling moat includes a first moat wall and a second moat wall, the first moat wall and the second moat wall each extend upwardly from the bottom surface of the annular flange at an angle of between 20° and 60° with respect to a longitudinal axis defined by an outer longitudinal surface of the annular flange.

10. The internal combustion engine of claim 9, wherein a depth of the cooling moat from the bottom surface of the annular flange is between 1.5 mm and 11 mm.

11. The internal combustion engine of claim 9, wherein the cooling moat of the cylinder liner includes a first moat wall and a second moat wall, and
wherein the first moat wall and the second moat wall each extend upwardly from the bottom surface of the annular flange at an angle of between 20° and 60°, with respect to a longitudinal axis defined by an outer longitudinal surface of the annular flange.

12. The internal combustion engine of claim 9, wherein a width between the first moat wall and the second moat wall is between 3 mm and 8 mm.

13. An internal combustion engine, comprising: an engine block having at least one engine cylinder; a cylinder liner mounted in the at least one engine cylinder; and an O-ring seal installed onto the cylinder liner, wherein the cylinder liner includes: a hollow cylindrical sleeve extending from a lower end and an upper end, the hollow cylindrical sleeve having an outer surface and an inner running surface, an annular flange extending radially from the upper end of the hollow cylindrical sleeve, the annular flange having a circumferential land portion and an upper cylinder liner seal groove disposed above the circumferential land portion, and a cooling moat defined by the sleeve, the cooling moat having a gap extending upwardly from a bottom surface of the annular flange toward the inner running surface of the hollow cylindrical sleeve and between the upper cylinder liner seal groove and the inner running surface, wherein the cooling moat includes a first moat wall and a second moat wall, the first moat wall and the second moat wall each extend upwardly from the bottom surface of the annular flange at an angle of between 20° and 60° with respect to a longitudinal axis defined by an outer longitudinal surface of the annular flange, and wherein the O-ring seal is installed onto the upper cylinder liner seal groove of the annular flange of the cylinder liner.

* * * * *